3,849,580
AEROSOL DISPENSING SYSTEM FOR ANHYDROUS EDIBLE FAT COMPOSITIONS

Vasant D. Sejpal, Hoboken, and William J. Lueschen and Bernard Weinstein, North Plainfield, N.J., assignors to American Home Products Corporation, New York, N.Y.

No Drawing. Filed Sept. 5, 1972, Ser. No. 285,992
Int. Cl. A23c 15/00
U.S. Cl. 426—116                                    2 Claims

ABSTRACT OF THE DISCLOSURE

The disclosure is directed to an aerosol dispensing system which delivers non-aqueous butter-like anhydrous edible fat compositions as a foam form on a predetermined surface. The disclosure is particularly directed to anhydrous butter compositions and anhydrous solid vegetable oil compositions having a solid fat index of 5 to 30 percent at 70° F. for use as comestible spreads, basting, and pan coatings.

---

The invention is directed to long shelf life compositions which are butter-like in their taste and appearance and which may be stored in aerosol dispensing containers without refrigeration. The compositions may be delivered from the aerosol containers in the form of a foam. The invention further relates to aerosol systems for delivering butter-like comestible spreads. The volume increase of the edible fats is about 350 percent from the non-foamed to the foamed state. While in the broadest sense the invention concerns edible vegetable oils, the preferred embodiment makes use of anhydrous butter.

In one advantageous embodiment the invention relates to anhydrous butter formulas which may be discharged from aerosol containers.

In another embodiment the disclosure is directed to a new dispensing system for butter and butter-like compositions which is made up of an aerosol dispensing can containing anhydrous butter and a food grade propellant.

In another advantageous embodiment vegetable oils commonly used for margarine-type products may be formulated so as to be compatible with an aerosol dispensing system.

The advantages of such formulations are that (1) they do not require refrigeration, (2) they are distinctive in that they are non-emulsified foams, because they have organic constituents and no aqueous constituents and (3) they are sterile compositions as described in the Journal of Microbiological Methods for the Examination of Butter, p. 23 (No. 137).

Anhydrous butter is natural butter which has been processed to remove water and caseinate solids. It is known in the literature variously as clarified butter, rendered butter, dehydrated butter (for instance in French and German cookbooks) and is available commercially from Land 'O' Lakes as a product called "Anhydrous Milkfat."

The most common oils used for margarine-type products are soyabean oil, cottonseed oil, corn oil, cocoanut oil and peanut oil and the use of such products is contemplated in the present invention. Other oils, such as sesame oil, sunflower oil, olive oil, and other edible oils may be incorporated into the formulations.

The physical structure of the product after discharge is a solid that consists of about 70 to 95 percent by weight of liquid fat at room temperature, and 5 to 30 percent solid fat in the form of leaflets, powder, or crystals. It is a feature of the present invention that the combination of liquid and solid fats give the edible fat of the present invention a soft semi-solid consistency at room temperature.

Vegetable oils may be prepared to resemble butter fat in their physical appearance. They may also be prepared softer than butter fat for better flow, if desired. Most of the vegetable oils are available in three forms either liquid oil, hydrogenated vegetable oil (hydrogenation gives higher melting point to the product) or partially hydrogenated vegetable oil which is substantially a mixture of the foregoing two forms.

The product may incorporate, besides anhydrous butter and the forementioned vegetable oils, constituents such as flavorings, colorings, thickeners, salt, mono and diglycerides, anti-oxidants and the like, depending on the appearance and use desired.

The propellant useful in formulations of the present invention may be any of the known food grade propellants, such as fluorocarbons, including Freon C–318 and Freon 115, hydrocarbons, such as isobutane, and nitrous oxide, carbon dioxide, nitrogen and the like. The aerosol containers may be filled with from 80 to 98 percent of the anhydrous butter.

Anhydrous butter is the preferred embodiment because of its generally desirable flavor and appearance. Also it is unusually stable at room temperatures; therefore refrigeration is not required to produce a long shelf life.

The peferred embodiment of the invention makes use of anhydrous edible fats for discharge from a container as a foam. Butter, which has been dehydrated by any one of the methods known in the art, is solvated by the selected propellant or mixtures thereof to solubilize the relatively solid butter for easy flow, and also to provide sources of bubble formation when pressure is released from the composition upon discharge from the container.

The closest known prior art is found in U.S. Pats. 2,796,363 and 3,038,816. The 2,796,363 patent is directed to compositions of matter for coating cooking utensils and discloses the use of compositions containing lecithin in a propellant fluid. There is no teaching or suggestion of the use of comestible spreads made up of anhydrous butter fat and vegetable oils or having a solid fat index of 5 to 30 percent at 70° F. for use as comestible spreads.

The Pat. 3,038,816 is directed to a method of producing an aerosol composition containing lecithin by dissolving lecithin in a fluorocarbon and adding to a cooled solution a sufficient amount of the non-toxic propellant in a liquid state to provide an overall vapor pressure of the composition at 70° F. of between 20 to 35 p.s.i.g. There is no teaching or suggestion of the use of a composition of anhydrous butter fats or vegetable oils having a solid fat index of 5 to 30 percent at 70° F. and a propellant system to produce comestible spreads having a long shelf life.

It is a feature of the present invention that the ingredients of the compositions have a low melting point which renders them soft enough to be discharged from the container in the aerosol embodiments. But in the aerosol embodiments, because of the expansion of propellants and resultant cooling the products are cooled to a more solid state upon discharge.

It is another feature of this invention that the formulations need not include preservatives because of the absence of water which provides long shelf life.

It is another feature of this invention that corrosion inhibitors are not needed to protect the container from corrosion because of the absence of water.

Any edible vegetable oil, liquid, hydrogenated, or partially hydrogenated in any combination may be used in the product, if the end product, that is the concentrate after the propellants have evaporated, has a solid fat index between 5 and 30 at 70 degrees Fahrenheit (° F).

It has been found that the effects of the invention may be obtained with formulations containing 80 to 98 percent by weight (w/o) of anhydrous butter or oils, the remainder being substantially all propellant. Formulations containing more than 98 w/o are too thin and liquidy and the pressure is too low for optimum discharge.

Similarly formulations containing less than 80 w/o anhydrous butter or oils are esthetically and organoleptically undesirable. The foam is too dry and stiff. The foam resultant structure lacks density.

The most advantageous results are obtained with about 94 w/o anhydrous butters or oils, the remainder being propellant.

The following examples are given by way of illustration and are not intended to limit the ambit of the appended claims.

EXAMPLE 1

This example illustrates the composition and preparation of a preferred embodiment of the present invention. The desired formulation was as follows:

| | Percent by weight |
|---|---|
| Anhydrous butter | 94 |
| Freon 115 | 2 |
| Nitrous oxide | 4 |
| | 100 |

The anhydrous butter was warmed to a pastelike consistency by heating to 70 to 82° F. The temperature must not be permitted to exceed 110° F. The temperature range is critical because if too hot the filled containers cannot be gassed without first being cooled.

The anhydrous butter is charged into containers with conventional semi-solid filling apparatus. The containers are crimped and closed with an aerosol dispensing nozzle. The propellant is charged into the containers through the dispensing nozzle with conventional aerosol filling apparatus.

The product when dispensed produces a uniform stable layer with good foam density.

EXAMPLE 2

This example illustrates the composition of anhydrous butter foam.

The following formulation was pre-mixed and charged into an aerosol can:

| | Percent by weight |
|---|---|
| Anhydrous butter | 90 |
| Nitrous oxide | 3 |
| Freon C-318 | 3 |
| Freon 115 | 4 |
| | 100 |

It was found that when the above mixture was dispensed from an aerosol container, a satisfactory comestible spread was produced as a foam. The anhydrous butter could be used wherever butter spread is used, for instance on toast, corn, bread and the like.

EXAMPLE 3

The following illustrates formulations that are comprised totally of anhydrous vegetable oils.

The procedure of Example 1 was followed but substituting the following formulation for the anhydrous butter:

| | Percent by weight |
|---|---|
| Hydrogenated cottonseed oil | 50 |
| Liquid cottonseed oil | 50 |

EXAMPLE 4

The following example illustrates the composition of a total anhydrous vegetable oil formulation.

The procedure of Example 1 was followed but the following formulation was substituted for anhydrous butter:

| | Percent by weight |
|---|---|
| Hydrogenated soyabean oil | 30 |
| Partially hydrogenated soyabean oil | 20 |
| Liquid soyabean oil | 50 |

EXAMPLE 5

The following illustrates the preparation of a formulation of single anhydrous vegetable oils having the characteristics of the present invention.

The procedure of Example 1 was followed but the following formulation was substituted for anhydrous butter:

| | Percent by weight |
|---|---|
| Cobee-110 (hydrogenated cocoanut oil with stearin blend) | 40 |
| Oil-1400 (Drew Chemical, liquid product of cocoanut oil origin) | 60 |

EXAMPLE 6

The following example illustrates the formulation of the present invention utilizing a combination of anhydrous vegetable oils.

The procedure of Example 1 was followed but the following formulation was substituted for anhydrous butter:

| | Percent by weight |
|---|---|
| Hydrogenated cocoanut oil | 30 |
| Hydrogenated soyabean oil | 20 |
| Cottonseed oil | 50 |

EXAMPLE 7

The following illustrates preparation of a combination of anhydrous vegetable oils utilizing the principles of the present invention.

The procedure of Example 1 was followed but the following formulation was substituted for anhydrous butter:

| | Percent by weight |
|---|---|
| Hydrogenated cottonseed oil | 35 |
| Hydrogenated cocoanut oil | 10 |
| Liquid peanut oil | 20 |
| Liquid corn oil | 35 |

EXAMPLE 8

The following illustrates the combination of anhydrous butter and vegetable oils.

The procedure of Example 1 was followed but the following formulation was substituted:

| | Percent by weight |
|---|---|
| Anhydrous butter | 47 |
| Anhydrous vegetable oil (any from Examples 3 to 7) | 47 |
| Nitrous oxide | 4 |
| Freon 115 | 2 |
| | 100 |

EXAMPLE 9

The following illustrates the combination of anhydrous butter and vegetable oils.

The procedure of Example 1 was followed but the following formulation was substituted:

| | Percent by weight |
|---|---|
| Anhydrous butter | 70 |
| Liquid soyabean oil | 24 |
| Nitrous oxide | 4 |
| Freon 115 | 2 |
| | 100 |

What is claimed is:

1. A dispensing system for comestible spreads not requiring refrigeration or included preservatives or corrosion inhibitors for prolonged shelf life comprising:
   (A) a pressure tight container;
   (B) a dispensing nozzle connected to said container;
   (C) about 2 to 20 percent by total weight of a food grade propellant;
   (D) about 80 to 98 percent by total weight of an anhydrous edible fat composition having a solid fat index of 5 to 30 percent at 70° F. selected from the class consisting of anhydrous butter, anhydrous solid vegetable oils and anhydrous liquid vegetable oils;
where the total weight is the weight of the propellant plus the weight of the composition.

2. A dispensing system for comestible spreads not requiring refrigeration or included preservatives or corrosion inhibitors for prolonged shelf life comprising:
(A) a pressure tight container;
(B) a dispensing nozzle connected to said container;
(C) about 2 to 20 percent by total weight of a food grade propellant; and
(D) about 80 to 98 percent by total weight of anhydrous butter having a solid fat index of 5 to 30 percent at 70° F. where the total weight is the weight of the propellant plus the weight of the composition.

References Cited
UNITED STATES PATENTS

| | | | |
|---|---|---|---|
| 2,796,363 | 6/1957 | Lalone | 117—134 |
| 2,836,497 | 5/1958 | Levin | 426—116 |
| 2,924,530 | 2/1960 | Levin | 426—116 |
| 3,038,816 | 6/1962 | Dreel | 106—243 |
| 3,189,466 | 6/1965 | McGrory | 426—116 |
| 3,230,091 | 1/1966 | Thompson | 426—116 |

WILBUR L. BASCOMB, Jr. Primary Examiner

M. G. MULLEN, Assistant Examiner

U.S. Cl. X.R.

426—194, 198, 200